US008849980B2

(12) United States Patent
Dieberger et al.

(10) Patent No.: US 8,849,980 B2
(45) Date of Patent: Sep. 30, 2014

(54) APPARATUS, SYSTEM, AND METHOD FOR MONITORING COMPUTER SYSTEM COMPONENTS

(75) Inventors: Andreas Dieberger, Los Gatos, CA (US); Sandeep Gopisetty, Morgan Hill, CA (US); Eser Kandogan, Mountain View, CA (US); Cheryl Ann Kieliszewski, San Jose, CA (US); Roberto C. Pineiro, Mayaguez, PR (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1871 days.

(21) Appl. No.: 11/347,951

(22) Filed: Feb. 6, 2006

(65) Prior Publication Data

US 2007/0185987 A1  Aug. 9, 2007

(51) Int. Cl.
*G06F 15/173*  (2006.01)

(52) U.S. Cl.
USPC ........... 709/224; 709/223; 709/226; 709/227; 715/708; 715/853; 715/854

(58) Field of Classification Search
USPC .................. 709/224, 223, 228; 715/734, 735; 707/770
See application file for complete search history.

(56) References Cited

U.S. PATENT DOCUMENTS

| | | | | |
|---|---|---|---|---|
| 5,226,120 A | * | 7/1993 | Brown et al. | 709/224 |
| 6,040,834 A | * | 3/2000 | Jain et al. | 715/853 |
| 6,122,664 A | * | 9/2000 | Boukobza et al. | 709/224 |
| 6,754,703 B1 | * | 6/2004 | Spring | 709/223 |
| 6,957,390 B2 | * | 10/2005 | Tamir et al. | 715/744 |
| 7,051,098 B2 | * | 5/2006 | Masters et al. | 709/224 |
| 2002/0080181 A1 | * | 6/2002 | Razdow et al. | 345/772 |
| 2002/0135610 A1 | * | 9/2002 | Ootani et al. | 345/734 |
| 2004/0068561 A1 | * | 4/2004 | Yamamoto et al. | 709/224 |
| 2006/0168208 A1 | * | 7/2006 | Nagami | 709/224 |

FOREIGN PATENT DOCUMENTS

EP  0737920  9/1991  ............. G06F 9/46

OTHER PUBLICATIONS http://silk.nih.gov/dbtek/viewdoc?vdsn=VPOD.D928246.PDF
"BrightStor Storage Resource Manager"—Jul. 2005, Computer Associates.*
"BrightStor Storage Management: Getting the most from Your Storage Resources"© 2005 Computer Associates International, Inc.

* cited by examiner

*Primary Examiner* — Randy Scott
(74) *Attorney, Agent, or Firm* — Kunzler Law Group (57) ABSTRACT

An apparatus, system, and method are disclosed for monitoring computer system components in large or complex systems. The apparatus includes an identifier module for associating at least one visual identifier with a computer system component. A function module associates one or more control functions with the visual identifier. A presentation module selectively displays the at least one identifier for the computer system component within a present view of a user interface. A monitoring module monitors the computer system component associated with the at least one identifier and modifies the identifier in response to a change in operational status for the computer system component.

20 Claims, 5 Drawing Sheets

APPARATUS, SYSTEM, AND METHOD FOR MONITORING COMPUTER SYSTEM COMPONENTS

BACKGROUND OF THE INVENTION

1. Field of the Invention

This invention relates to an apparatus, system, and method for monitoring computer system components in a graphical topologic viewer, and more particularly relates to an apparatus, system, and method for keeping "low-level" or detailed information for a computer system component visible in high-level overviews of large or complex systems.

2. Description of the Related Art

Administration of information technology (IT) systems is becoming more and more complex as the size and complexity of these systems increases. Many IT systems include multiple client systems, host systems, and/or application systems that interact with multiple local or remote servers across local-area networks, wide-area networks, storage area networks, intranets or the Internet. These systems often include a variety of storage devices and repositories, all linked together by communication lines and ports. Devices used to manage and administer large and complex systems often rely on visual representations of the overall system or its components. However, due to the complexity and size of today's systems, it is generally impossible to represent the system as a whole in one representation. Instead, visual representations of systems often rely of variations of semantic or graphical zooming that hide or reveal various levels of detail pertaining to the system or its opponents. One challenge with this type of progressive information disclosure is that specific details of a particular component are often lost (no longer visible) when switching from low-level views to high-level views. Another drawback to these visual representations is that they rely on reducing the amount of information that can be shown to a user at the same time, in order to provide system overviews.

Many administration tasks require maintaining a high-level overview of the system as a whole, while at the same time, showing very detailed information about a select small number of items or components. Conventional approaches, however, do not provide for this kind of viewing, particularly if the items or components under observation are distributed throughout, or are in, remote parts of the overall system. For example an administrator of a storage administration system may want to maintain an overview of the entire storage topology, potentially encompassing several storage area networks (SANs) and locations in a dashboard fashion in order to monitor the overall system status. However, present devices, systems, and methods do not allow this overview while at the same time allowing the administrator to monitor in greater detail, a particular storage subsystem or component.

From the foregoing discussion, it should be apparent that a need exists for an apparatus, system, and method that would allow the details of a component to be viewed regardless of whether the present view is a less-descriptive high-level view of the system in which the component resides. It would be a further advancement to provide such an apparatus, system, and method that would allow interaction with a particular component regardless of the system view. It would be another advancement to provide such an apparatus, system, and method that would allow a detailed view of components residing in different locations within the overall system. It would yet another advancement to provide such an apparatus, system, and method that would allow displayed components to act as navigational links to more detailed views of the component. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available computer system component monitors. Accordingly, the present invention has been developed to provide an apparatus, system, and method for monitoring a computer system component that overcomes many or all of the above-discussed shortcomings in the art.

An apparatus to monitor a computer system component is provided with a plurality of modules configured to functionally execute the necessary steps of associating a visual identifier ("identifier") with a computer system component, associating a control function with each identifier, and selectively displaying an identifier associated with a computer system component in a present view. These modules in the described embodiments include an identifier module, a function module, a presentation module, and a monitoring module. Thus, certain computer system components may be identified and selectively displayed through a user interface regardless of the current or present overall view of the system.

The apparatus, in one embodiment, is configured to display an identifier associated with a computer system component such that control functions associated with the computer system component can be accessed directly from the present view of the user interface. The apparatus may further be configured to selectively display the current status of a particular computer system component. In another embodiment, the apparatus is configured to display the context of a particular computer system component. The apparatus may display the hierarchy or directory chain or location of the particular component vis-à-vis the overall system.

In a further embodiment, the apparatus may be configured to simultaneously display identifiers associated with multiple computer system components residing in different locations within the overall system. The apparatus may present a detailed view of multiple components in the same present view. The apparatus may also display an identifier associated with a computer system component such that the identifier functions as a navigational link to a more detailed view of the computer system component. In one embodiment, a navigation module allows a user to change the present view to a more detailed view of a computer component by selecting an identifier associated with that component.

A system of the present invention is also presented to monitor a computer system component. The system may be embodied as a storage area network utility. In particular, the system, in one embodiment, includes one or more data storage servers in communication over a communication network. The system may include a client in electronic communication with the server or servers. A component monitor apparatus may be configured to display identifiers representing computer system components attached to the network. The identifiers of the computer system components are displayed on a user interface and a user may interact with the identifiers through one or more input devices. The system may include a memory containing modules for execution on a processor. In one embodiment, the modules include those discussed above, in the form of a component monitor apparatus.

In one embodiment, the system displays a visual identifier associated with a computer system component, such that control functions associated with the computer system component can be accessed directly from the present view of the user interface. In another embodiment, the system displays a context and/or a status of each computer system component in the system.

A computer program product is also presented. The computer program product includes a computer usable medium having computer usable program code for monitoring computer system components. The computer program product includes computer usable program code for associating at least one identifier with a computer system component, computer usable program code for associating one or more control functions with each computer component associated with a visual identifier, and computer usable program code for dynamically and selectively displaying at least one identifier for each computer system component associated with a visual identifier, to a present view of an user interface.

In one embodiment, the computer usable program code includes an operation to display a visual identifier associated with a computer system component, such that control functions associated with the computer system component can be accessed directly from the present view of the user interface.

In another embodiment, the computer usable program code includes an operation to selectively display the computer system component status in a present view. The computer usable program code may also have an operation to selectively display the computer system component context or status in a present view. In one embodiment, the computer program product may include computer usable program code to perform the functions of the modules discussed above.

A method of the present invention is also presented for monitoring a computer system comprising a plurality of computer system components. The method includes identifying a computer system to monitor, initiating a user interface, and executing an apparatus to monitor a computer system component through the user interface. The apparatus includes a plurality of modules configured to associate at least one visual identifier with a computer system component, associate one or more control functions tailored to each computer system component associated with a visual identifier, and selectively display at least one identifier for each computer system component associated with a visual identifier, to a present view of an user interface.

In one embodiment, the identifier associated with a computer system component is displayed such that control functions associated with the computer system component can be accessed directly from the present view. A status and/or context of the computer system component associated with a visual identifier may also be selectively displayed in a present view.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program product may take any form capable of generating a signal, causing a signal to be generated, or causing execution of a program of machine-readable instructions on a digital processing apparatus. A computer program product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
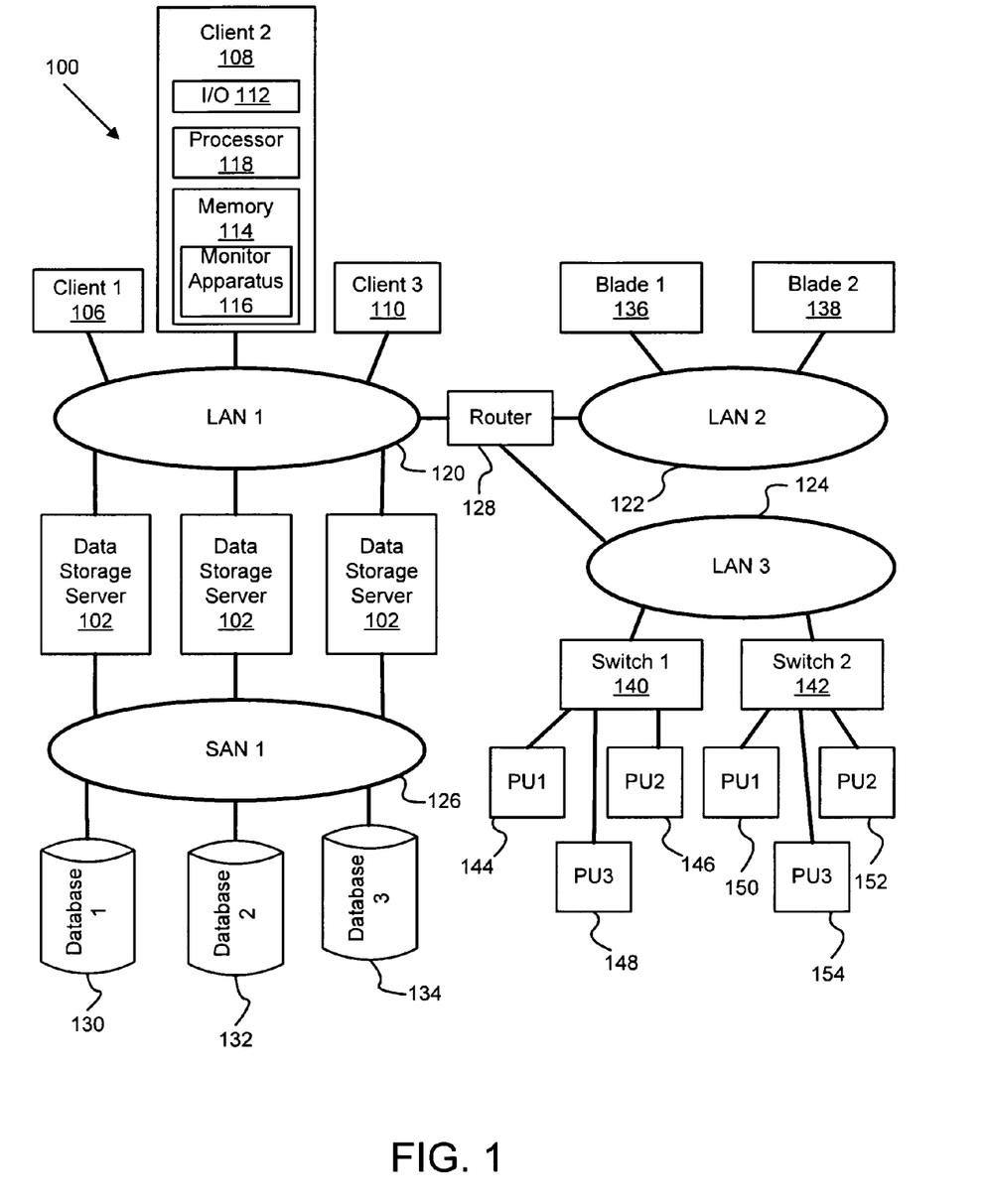
FIG. 1 is a schematic block diagram illustrating one embodiment of a system for monitoring a computer system component in accordance with the present invention.

FIG. 1 depicts a system 100 to monitor a computer system component in a storage area network or other large or complex system. In one embodiment, the system 100 includes one or more data storage servers 102 in communication over a communication network. A number of clients 106, 108, and 110 may be in electronic communication with the one or more servers 102. Input/Output (I/O) devices 112 coupled to the data communications network are configured to interact with a user.

In one embodiment, the I/O devices 112 include a graphical user interface of the overall system. In another embodiment, the I/O devices 112 include a topology user interface for viewing the topology of the overall system. The system 100 includes a memory 114 containing modules 116 that can be executed on a processor 118. As will be discussed in greater detail below, the modules 116 include an identifier module, a function module, and a presentation module. In one embodiment, the modules together form a component monitor apparatus.

The system 100 may also include one or more large area networks (LANs) 120, 122, and 124 and one or more storage area networks (SANs) 126. The LANs may be connected through a router 128. The SAN may communicate with the data storage servers 102 and with one or more databases 130, 132, and 134. It will be appreciated by those of skill in the art that the system 100 may be utilized in connection with various different kinds of networks or fabrics, including without limitation, wide area networks (WANs), intranets, the Internet, and the like.

The LANs 120, 122, and 124 may interact with one or more blades 136, 138 and/or with one or more switches 140, 142, or other routing devices such as directors, routers, and the like. Each switch 140, 142 in turn interacts with one or more processing units (PUs) 144, 146, 148, and 150, 152, 154 respectively. It will be appreciated by those of skill in the art that the PUs may include a variety of hardware, software, and firmware alone or in combination with each other. The PUs may include without limitation, fabrics, blades, computers, servers, storage devices, networks, switches, routing devices and the like. Thus, the system 100 can be utilized with a variety of configurations. As used in this specification, "computer system component" or "component" may include any of the devices illustrated in FIG. 1, or combination of devices, including without limitation, computers, PUs, clients, hosts, application systems, servers, storage devices, databases, switches, blades, fabrics, memory, communication links, ports and the like. It will be appreciated by those of skill in the art, that the modules 116 may reside in another client 106 or 110, or in another component.

The I/O devices 112 may include a graphical user interface that allows a user to monitor the components of the system on an output device such as a monitor screen. The I/O devices 112 also include a mouse keyboard and/or other devices that allow a user to select items, or interact with items, on a monitor screen by clicking on them with a mouse, or using a keyboard or other pointing device. Each component may have a "primary" or "detail" view that provides the greatest amount of detail related to that component, or at least a greater amount of detail than an overall view. By clicking on various parts of the screen, or on various representations on the screen, the graphical user interface allows a user to view the overall system 100, or individual components such as the LANs 120, 122, and 124 with their respective clients 106, 108, and 110, blades 136, 138, and switches 140, 142. The graphical user interface may allow a user to view each PU coupled to a particular Switch 140 or 142 by clicking on that PU. The graphical user interface may also allow a user to view each database 130, 132, and 134 or the individual ports of any individual component by clicking on that component.

Accordingly, the graphical user interface may allow a user to choose as a present view an overall view of the system, or by clicking in the appropriate place, progressively more detailed views of subsystems with their individual components or a detailed view of the components themselves. In one embodiment, the views may include increasingly greater detail of a component as the user changes the present view from an overall view to a view of an individual component by using I/O devices 112 such as the mouse.

Each component may be part of a context that includes the components connected to it, components in an adjacent view, whether more or less detailed, and/or a group of similar components to which a particular component belongs. For example, a context for LAN1 120 may include the group of LANs 120, 122, and 124 and the Data Storage Servers 102 that are connected to LAN1. The context of LAN1 120 may also include the Clients 106, 108, and 100 that are connected to LAN1 120. The context may also include the router 128. A context for a component provides a general visual perspective of the environment in which the component resides.

In one embodiment, the user may employ control functions regarding the component at the detail or primary view of the component. For example, in the detail view of a component, a user may be able to reclassify the component into a different zone or to assign an administrator to the component. The user may be able to trigger a service request or conduct some related administration activity regarding the component, such as fencing or restarting the component. In one example, where the component is a storage device, a user may be able to upgrade a driver that is installed on the storage sub-system. A user may use control functions to change the configuration or operation properties that would assist a system administrator. In one embodiment, the graphical user interface may allow a user to change to a detail view displaying a component. From the detail view, the user could perform any number of administrative or other functions, including a reboot of the component.

The modules 116, allow a user to identify particular components for monitoring by associating a visual identifier with the component. In one embodiment, as will be discussed in detail below, a presentation module displays a visual identifier associated with a computer system component such that control functions associated with the computer system component can be accessed directly from a present view of the graphical user interface. Thus, for components associated with a visual identifier, a user may perform control functions by selecting a visual identifier shown in the present view without having to change the present view to the detail or primary view of the component, or even a more detailed view of the component than the current present view.

Figure 2:
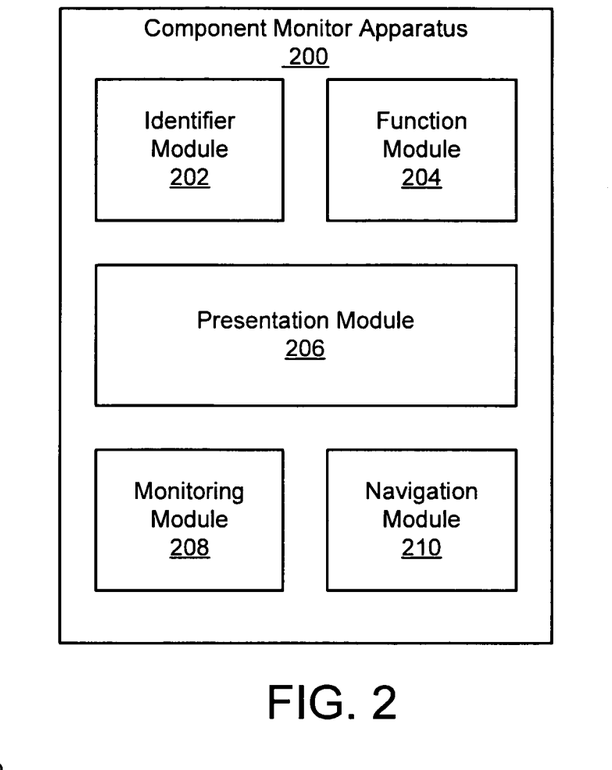
FIG. 2 is a schematic block diagram illustrating an apparatus for monitoring a computer system component in accordance with the present invention.

Referring now to FIG. 2, an apparatus 200 to display a computer system component is shown. In one embodiment, the apparatus 200 is the component monitor apparatus 116 discussed in connection with FIG. 1. The apparatus 200 includes an identifier module 202, a function module 204, a presentation module 206, a monitor module 208, and a navigation module 210 that cooperate to provide a graphical topology view of an information technology system for use by an administrator or other user. The modules 202, 204, 206, 208, and 210 provide a visual representation of a user's information technology system environment.

The identifier module 202 is configured to associate at least one visual identifier with a computer system component. The visual identifier serves to tag the component for specific monitoring. Thus, a user or administrator may "pin" or "tag" a component such as a specific computer or a port for special attention and monitoring. A visual identifier may be any visual indication or marking that identifies a component as being tagged for monitoring. A visual identifier may comprise the component's name appearing on a graphical user interface such as a monitor. The visual identifier may comprise a key word located in a certain portion of a screen display. The visual identifier may also be a representation of the component in a list or it could be an icon such as a pin or flag. The visual identifier may comprise a highlight or font attribute. As will be discussed in greater detail below, the identifier may be a particular attribute associated with a component. The identifier may also be a combination of the foregoing.

In one embodiment, the visual identifier is manually associated with a component. A user may have a list of components that the user wishes to monitor more closely. Certain components may interest an administrator for whatever reason. The user may use the control functions to identify a component that the user wishes to associate with an identifier (i.e. "pin"). The user may use the graphical user interface to type in that list or to mark a checkbox in order to indicate that an item is to be pinned. The user may also right-click on a component in the topology view, or otherwise invoke an action in order to pin the component.

In another embodiment, the association of an identifier with a component may occur automatically. For example, if a port or communication link registers an error, or if there is a change in the functional or operational status of the component, the identifier module 202 may automatically associate a visual identifier with that component. Once an identifier is associated with a component, the presentation module 206 displays the identifier in the user interface to allow closer monitoring of, and greater access to, the component.

The function module 204 is configured to associate one or more control functions with the visual identifier. As discussed above, a control function may be any of a number of administrative activities, including without limitation, naming functions, warning functions, tracking functions, storage-related activities, grouping functions, and the like. A control function may allow a user to reboot a component or perform maintenance or diagnostics on the component.

In one embodiment, a user might right mouse click, double-click on, or otherwise interact with the visual identifier to send the associated component a command. In the present configuration, components associated with visual identifiers may be accessed by means of the visual identifier rather than navigating to the detail or primary view of the component, even if the detail or primary view of the component is not in the present view. So long as the visual identifier is in the present view, control functions associated with the identified component can be accessed, regardless of the where the component is located and regardless of whether the present view is at the detail level of the component. In one embodiment, the control functions available to a user by clicking a visual identifier are a subset of all of the control functions available to a user in a detail view of the component.

For example, referring again to FIG. 1, an administrator may want to reboot, rename, or perform some other control function on PU3 154 of Switch2 142. If PU3 154 has been associated with a visual identifier, and if that identifier is displayed in the present view, then even if the present view is an overall view displaying components such as those shown in FIG. 1, the control functions associated with PU3 154 are accessible to a user. Thus, an administrator, desirous of performing a reboot of PU3 154, does not have to first "drill" or "navigate" down to a primary or detail view the includes PU3 154 before performing the reboot. In other words, the administrator does not need to first click on LAN3 124, then click on Switch 2 142, and then click on PU3 154 to get to a detail view of PU3 154 before performing the reboot of PU3 154.

Referring again to FIG. 2, the presentation module 206 is configured to selectively display at least one visual identifier associated with a computer system component within a present view of a user interface. In one embodiment, the visual identifier will appear in the present view regardless of whether the user chooses the present view to be an overall view of the entire system, a detail view of a particular component, or a contextual view of related components in a group. As the graphical user interface changes views, the visual identifier will remain in the present view. In another embodiment, the presentation module 206 displays the visual identifiers associated with components of a particular group. For example, if a user has decided to view the computers within a particular system, just the visual identifiers associated with computers, i.e. the "pinned" computers, would be displayed in the present view. If the user changes the view to a different context such as a group of routing devices, the "pinned" computers may no longer be visible in certain embodiments. Preferably, presentation module 206 references an indicator or setting value to determine whether to show pinned components based on context or show pinned components regardless of context (i.e. the level of the view as it relates to the grouping of components).

The visual identifier may be updated with new information pertaining to the associated component, but once the visual identifier is associated with a component, the visual identifier will remain in the present view of the user interface. As will be discussed in greater detail below, the visual identifier can be displayed in a variety of ways, included without limitation, as a graphical representation, as a textual representation, as part of a list or table, as part of a popup window, as a combination of the foregoing, and the like. Given the configuration of the function module 204, the presentation module 206 may display the visual identifier such that a user can perform or apply a control function associated with the computer system component to the computer system component directly from the present view of the user interface.

The monitor module 208 is configured to monitor the computer system component associated with the at least one visual identifier and to modify the visual identifier in response to a change in operational status of the associated computer system component. For example, if an administrator has associated a visual identifier with a particular port (i.e. "tagged" or "pinned" a port) that is prone to periodically fail, the monitor module 208 will monitor that component. The visual identifier associated with that component, which is selectively in the present view of the user interface, may indicate by way of an icon, highlighting, label, or otherwise, that the port is functioning properly. Were the port to fail, or otherwise become inefficient or undergo some status change, the monitoring module 208 would detect this change. The monitoring module 208 may communicate with the presentation module 206 such that the visual identifier reflects that change. The change may be manifest in the visual identifier by a change of icon, highlight, label, or other indicator.

The monitor module 208 may be preprogrammed to identify any number of status conditions for each component in a system. For example, if the component is a computer, the monitor module 208 may be programmed to identify three or four stages of battery life or power for the computer. The presentation module 206 may indicate full power for the component by a green battery icon as the visual identifier or as part of the visual identifier for the computer. If the computers battery status drops to a certain predetermined level, the monitor module 208 detects the change of status and the visual identifier for the computer may change to a blue battery icon. It will be appreciated by those of skill in the art that a number of status conditions may exist for each component and may be represented as, or with, the visual identifier for that component in any number of different ways.

In one embodiment, the monitor module 208 periodically "pulls" the status condition for each of the components associated with visual identifiers in order to update a status that comprises or is part of the visual identifier. In another embodiment, the status of the components associated with visual identifiers is "pushed" to the monitor module 208, which then updates the status for the particular component.

The navigation module 210 is configured to change the present view to a detail view of a computer system component in response to a user selecting a visual identifier associated with the computer system component and issuing a "detail view" command. For example, by mouse-clicking on a visual identifier for PU2 146 (FIG. 1), the navigation module 210 changes the present view to the detail or primary view of PU2 146 becomes the present view. Thus, if the present view is an overall view of the entire system, and PU2 146 has a visual identifier associated with it, a user may navigate directly to the detail view of PU2 146 without first having to navigate through multiple intermediate views.

In this configuration, the apparatus 200 acts as a virtual tunneling device to the "pinned" item; the component associated with the visual identifier. In systems with several levels of semantic zooming, a "pinned" item from the most detailed level view would stay visible even in the most general overall view. For example, if Database2 132 (FIG. 1) is associated with a visual identifier, a user may "zoom out" to view the context of SAN1 126 (FIG. 1) or all the way to the overall view of the system, and yet the apparatus 200 would still show the visual identifier associated with Database2 132 (FIG. 1), along with any status or other information that is part of the identifier. The details of components not associated with the identifier are typically not visible from the high-level overall view of the system. Thus, the Function Module 204 allows a user to directly interact with, and control the component (even from a high-level present view) and the Navigation Module 210 allows a user to jump from an overall view directly to a low-level or detail view of the component.

Figure 3:
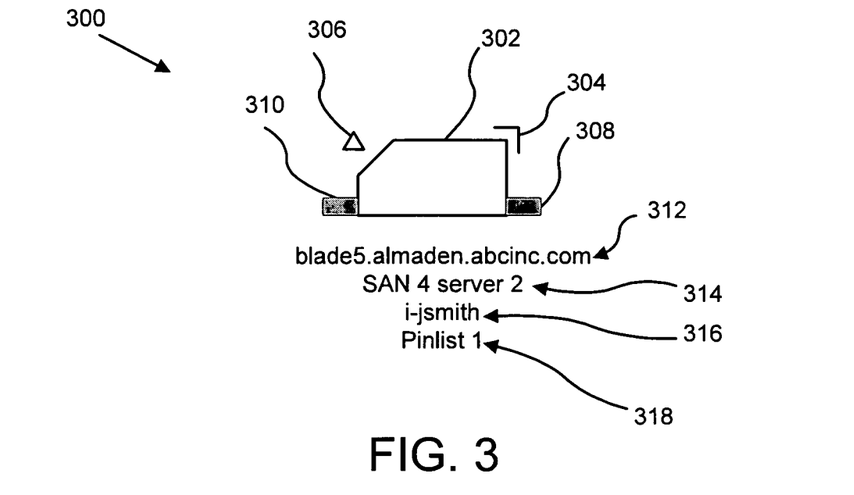
FIG. 3 is a schematic block diagram of a representation of a computer system component identifier in accordance with the present invention.

Turning now to FIG. 3, one embodiment of a visual identifier 300 in accordance with the present invention is illustrated. The identifier 300 may include an icon 302 that represents a type of component. The identifier 300 may also include a highlight 304, the location and design of which represents the computer system administrator contact responsible for the component. The identifier 300 may also include a status icon 306. As discussed above, the status icon may represent a status of the component and the shape or color of the icon may represent a different status. In the illustrated embodiment, the identifier 300 includes icons 308 and 310 that represent the component group association and a component priority respectively.

In one embodiment, the identifier 300 includes the name 312 of the component. The name 312 may include the type of component, the location of the component, and the owner of the component. The identifier 300 may also include context information 314. For example, the context information 314 illustrates that identifier 300 belongs to server 4 of SAN 2. The identifier 300 may also list the person 316 who associated the component with a visual identifier 300, i.e. the person who decided to "pin" or "tag" the item. The identifier 300 may also include a "pin list" indicator 318 to identify a list of related components that have been associated with a visual identifier. In one embodiment, the list is a list of all components identified by a particular administrator. The list may also contain all of the components that have a history of requiring additional maintenance. It will be appreciated by those of skill in the art that there may be any number of rationales for grouping "pinned" components in a pin list.

The visual identifier 300 may be represented in a variety of ways utilizing a variety of names, indicators, fonts, highlights, or icons. Additionally, the identifier 300 may include information or attributes, the presence of which may act as a visual identifier. For example, the identifier may include the following attributes without limitation: a component name, a component type, a component path, a component level, a component function, a component description, a component status, a component location, a component context, a component group association, a component administrator, the name of the person who associated the component with a visual identifier, a component priority, a visual identifier list, and the like.

Figure 4:
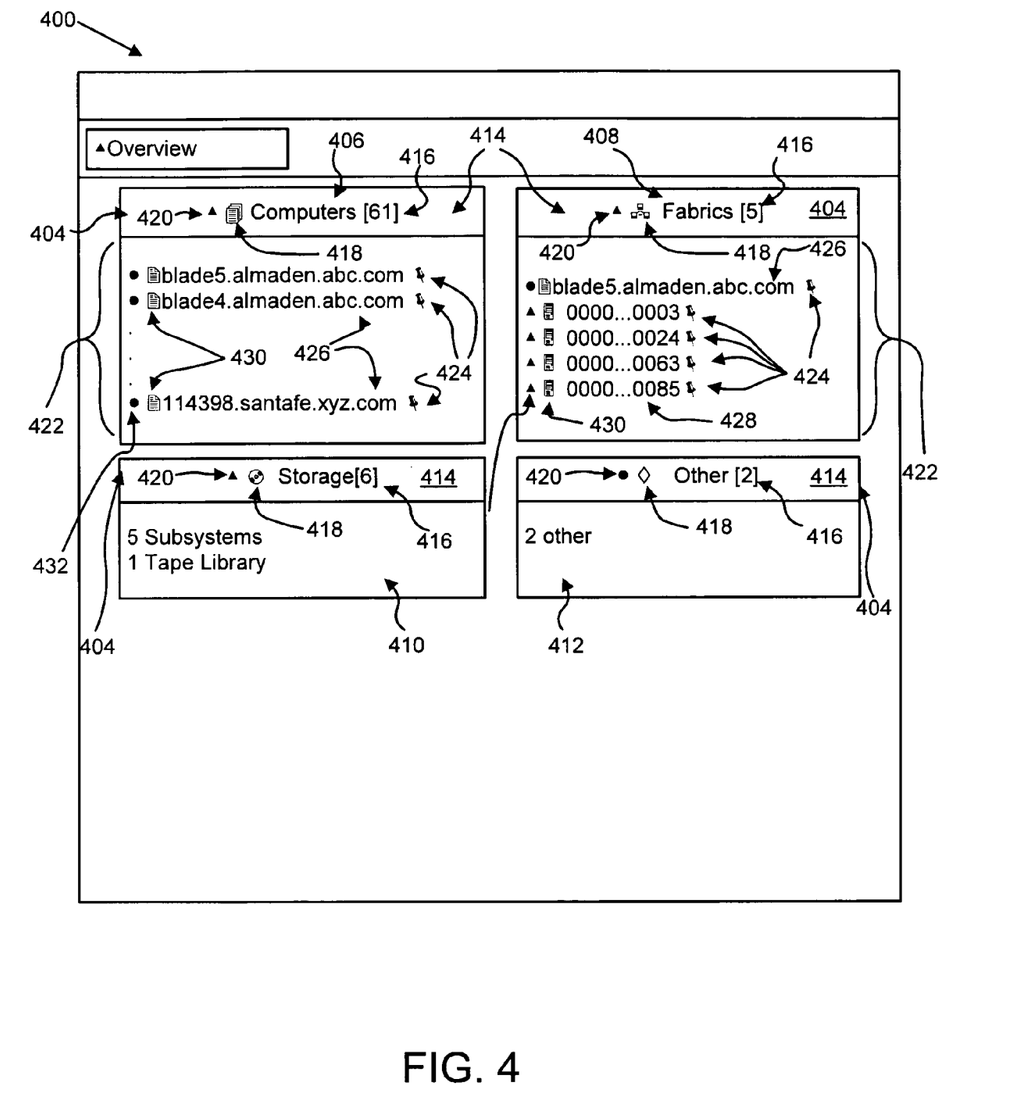
FIG. 4 is a schematic block diagram of a representation of a user interface in accordance with the present invention.

FIG. 4 illustrates one embodiment of a present view 400 of a user interface display used in connection with the apparatus 200. The user interface display, in combination with the apparatus 200, allows a user to semantically or visually zoom to higher or lower levels of component detail. By associating visual identifiers with components, a user can look at the whole system, or some portion of the system, without losing detailed information components that are important to the user.

The presentation module 206 couples a visual identifier to an icon representing a container or grouping of the computer system component associated with the icon. In one embodiment, the container is a system or subsystem 404 to which the component associated with the visual identifier belongs. The apparatus 200, is configured to display the major subsystems or containers 404 of the overall system or environment. For example, in one embodiment, the apparatus displays the computers 406, the fabrics 408, the storage 410, and the other subsystems 412. Each of the major subsystems 404 may have a title block 414. The title block 414 may contain information regarding the subsystem groups 404 such as an overall number 416 of components within the group 404, a representative icon 418 for the group 404, and/or a status icon 420.

Each subsystem group 404 may contain any number of visual identifiers that are associated with components. The visual identifiers associated with the components may include a name 426, a serial number or other alphanumeric representation 428, a type icon 430, a status icon 432 and/or a pin icon 422. As discussed above, the visual identifiers may include any number of things, including the mere existence in any component name or representation in the group 404.

Thus, the presentation module 206 of the apparatus 200 is configured to simultaneously display visual identifiers 422 associated with a plurality of computer system components within the present view. At least one of the computer system components shows certain detail view information outside the scope of the present view. For example, the apparatus 200 allows "blade5.almaden.abcinc.com" and "fabric 0000 . . . 003", which may normally be physically located, and visually represented, in different areas, to be displayed simultaneously, regardless of the scope of the present view 400.

In another embodiment, the visual identifiers 422 associated with components are grouped accordingly to different criteria. For example, the visual identifiers 422 can be grouped according to the task that the associated component performs. In another embodiment, multiple pin lists are grouped according to the administrator for the associated component or the administrator who determined to associate the component with a visual identifier 422. The apparatus 200 allows components to be associated, or "pinned" with a visual identifier 422, in a number of different ways or for a number of different reasons.

In one embodiment, a group 404 of pinned items can be used to alert administrators to emerging problems or situations pertaining to certain components. Components can be pinned by remote administrators or by an automatic process. For example, a software agent monitoring the system as a whole may alert a user or administrator to a potential problem by associating components to visual identifiers 422 that would automatically appear in the present view. In one embodiment, the apparatus 200 allows one administrator to associate a component that the administrator is working on with a visual identifier 422. In this way, other administrators maybe alerted that this particular component needs to be monitored. Thus, the present invention discloses an apparatus 200 that can be used as a collaborative tool for sharing and assigning work inside groups of administrators.

It will be appreciated by those of skill in the art that components associated with visual identifiers 422 by automatic processes can be kept separate from those associated with the administrator or other people. Accordingly, the apparatus is capable of displaying and keeping multiple lists of "pinned" components.

In one embodiment, the status icon 432 is a computer system component status that is part of the associated visual identifier 422 that the presentation module 206 may selectively display in the present view. In one embodiment, the status icons 418 in the title block 414 of the groups 404 function like the status icons 432 associated with the components. In one embodiment, shapes and colors are used to denote various statuses of the computers. A green square may indicate that everything is functioning normally, a yellow triangle can indicate a warning that there may be a problem. A red circle may indicate a critical condition for the component. In one embodiment, if the individual group 404 contains components with mixed statuses, the group may use the status icon representing the status of the component with the most critical status.

In one embodiment, components can become automatically associated with a visual identifier 422 when the status of that component reaches a certain stage of criticality. The component, once associated with the visual identifier 422, becomes selectively visible in the present view of the user interface. In this way, the appearance of the identifier 422 associated with a component immediately alerts the administrator that a component needs attention.

Each visual identifier 422 includes a computer system component context that the presentation module 206 may selectively display in the present view. In one embodiment, an icon 430 serves to represent the type of components to which the component associated with a visual identifier 422 belongs. In another embodiment, the listing of the component within a group 404 list serves as the associated identifier. The listing of the component as part of a group 404 shows a context for that component.

Thus, the present invention is more than a list of favorite or tagged components. For example, if a switch is contained in such a favorites list an administrator would not be able to tell what SAN the switch belonged to. In addition, items in a favorites list typically do not show live status information for the items in the favorites list. These items are simply pointers. Users can use the pointer to open a view showing that item in context, but at the cost of moving away from the view the user is are currently in and losing the information from that view.

Figure 5:
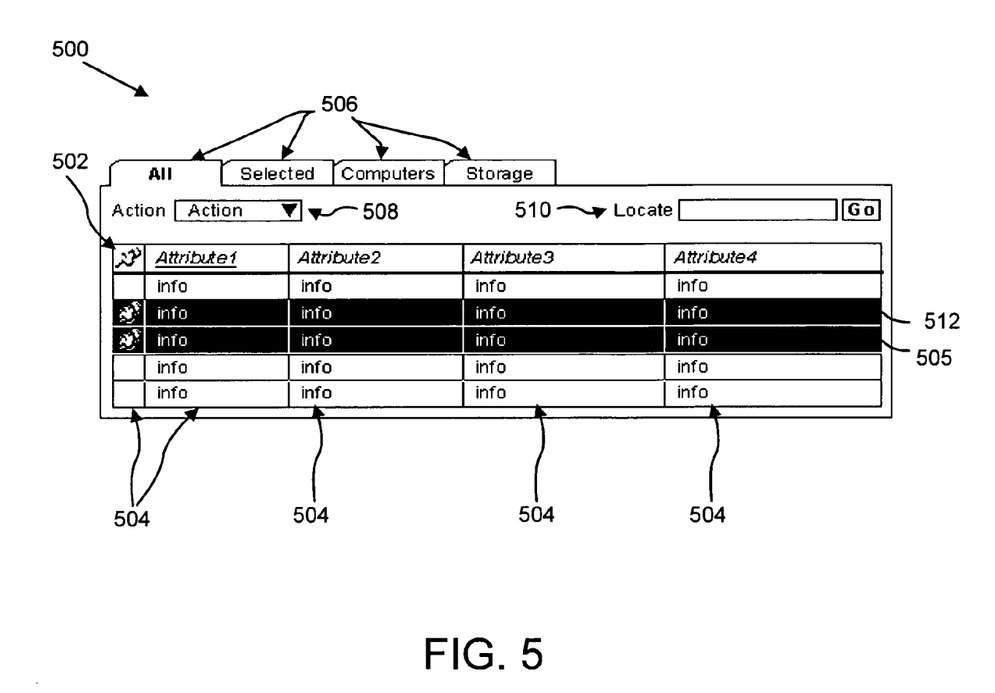
FIG. 5 is a schematic block diagram of another embodiment of a representation of a user interface in accordance with the present invention.

Referring now to FIG. 5, an alternative embodiment of a present view of a graphical user interface is illustrated. In this embodiment, a table 500 represents components. Components associated with visual identifiers may be indicated by a pin or other icon in a pin column 502. In one embodiment, these components are indicated by a highlight bar 505. Other columns 504 may represent various attributes of the component. The visual display of these attributes and/or the presence of the attribute in the table, may serve as a visual identifier and indicate that an associated component has been "pinned." As discussed above, the attributes in one embodiment include without limitation, the component name, the component type, the operating system used by the component, the administrator of the component, the physical location of the component, the virtual location of the component, the environment in which the component resides, component context indicators, a component status, and the like.

The table 500 may also provide a drop-down box 508 for performing various control functions associated with a component. In one embodiment, a text-box 510 may serve as a navigational tool. In one embodiment, a pin list may be displayed as a separate pop-up window, floating panel, or window that lists all components associated with visual identifiers 422, along with their statuses.

Tabs 506 may represent different groups of components. In one embodiment, the table 500 is a hierarchical table and allows a user to collapse it and/or expand groups of rows in the table. In this embodiment, each of these groups then may represent one group 404 in a graphical view as illustrated in FIG. 4.

Accordingly, the apparatus 200 and system 100 of the present invention allows a user to view multiple levels of detail with collapsible collections of components. Collapsed groups of components may be shown as summary representations as in FIG. 4. The status and type of component are shown by visual identifiers regardless of the level of abstraction or detail in the present view. Additionally, the components are visible and can be directly interacted with.

A computer program product is also presented. The computer program product includes a computer usable medium having computer usable program code for monitoring computer system components. The computer program product includes computer usable program code for associating at least one identifier with a computer system component, computer usable program code for associating one or more control functions with each computer component associated with a visual identifier, and computer usable program code for dynamically and selectively displaying at least one identifier for each computer system component associated with a visual identifier, to a present view of a graphical user interface.

In one embodiment, the computer usable program code includes an operation to display a visual identifier associated with a computer system component, such that control functions associated with the computer system component can be accessed directly from the present view of the user interface.

In another embodiment, the computer usable program code includes an operation to selectively display the computer system component status in a present view. The computer usable program code may also selectively display the computer system component context or status in a present view. In one embodiment, the computer program product may include computer usable program code that includes operations to perform the functions of the modules discussed above.

Programmed instructions of the computer usable program code may include an operation to selectively display a visual identifier comprising a computer system component context in the present view. In one embodiment, the computer program product includes an operation to simultaneously display visual identifiers associated with a plurality of computer system components within a present view, with at least two of said computer system components having a detail view outside the scope of the present view. The computer program product allows a user to change the present view to a detail view of a computer system component by selecting the visual identifier associated with the computer system component.

The computer program product can display the identifiers in a number of ways discussed above, including coupling the identifier to an icon representing a container of the computer system component associated with the icon. The computer program product may contain code to selectively display a pop-up window containing one or more identifiers.

The computer program product displays the identifiers in such a way that a user can select a control function associated with the identifier and computer system component and apply control functions to the computer system component directly from the present view of the user interface.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
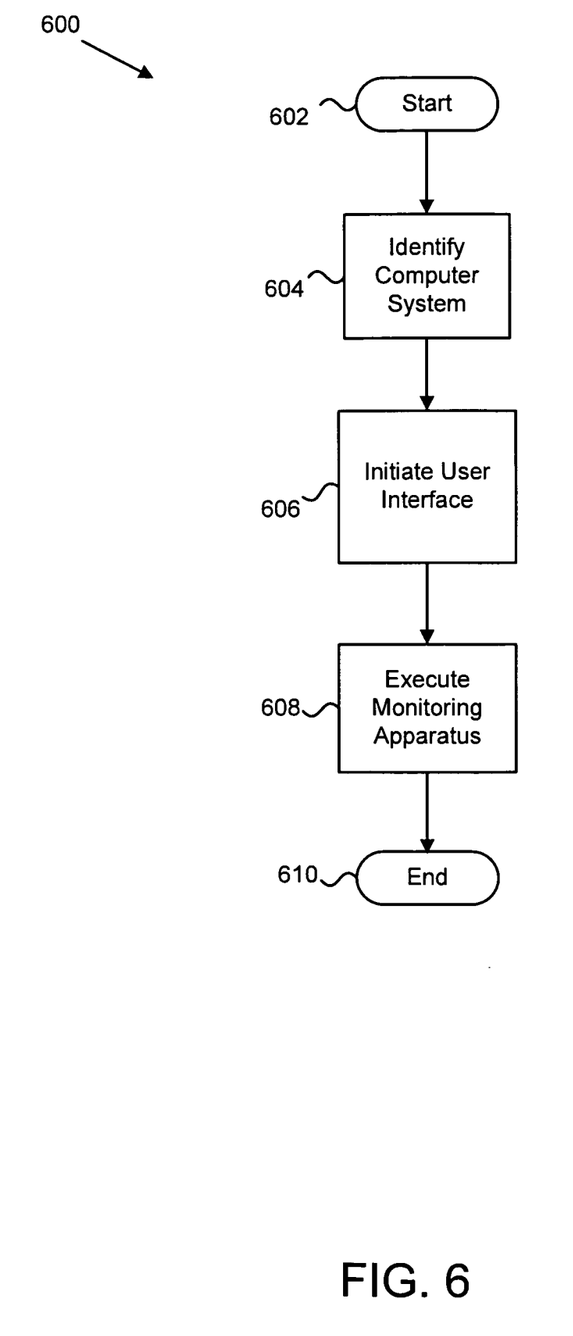
FIG. 6 is a schematic flow chart diagram illustrating one embodiment of a method for deploying a monitor utility in accordance with the present invention.

Referring now to FIG. 6, a method 600 is disclosed for monitoring a computer system having a plurality of computer system components. As discussed above, the components could be broad range of devices, links, computing or storage systems, subsystems, and the like. The method starts 602 and includes identifying 604 a computer system to monitor. A user interface is initiated 606 and an apparatus to monitor a computer system component through the user interface is executed 608.

In one embodiment, the apparatus includes the modules discussed above in connection with the system 100 and apparatus 200. The modules associate at least one visual identifier with a computer system component. The modules associate one or more control functions with each computer system component associated with a visual identifier. The modules also selectively display at least one identifier for each computer system component associated with a visual identifier, to a present view of the user interface.

In one embodiment, the modules are configured to display the visual identifier such that a control function associated with the computer system component and selected by a user can be applied to the computer system component directly from the present view of the user interface. Thus, the user does not have to navigate to another view before performing the control function on the component associated with the visual identifier. The visual identifier may include a component status and/or a component context that provides information regarding the environment of the component. In one embodiment, the component status and component context are selectively displayed in the present view.

The present invention allows is an improvement on graphical topology viewers, which rely heavily on semantic or visual zooming and progressive information disclosure. The present invention allows users to cope with large amounts of information shown while allowing the user to selectively show a number of very specific items in view and in context.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to monitor a computer system component, the apparatus comprising:

an identifier module that associates a visual identifier with a computer system component, the visual identifier identifying an initiator of the association of the visual identifier with the computer system component;

a function module that associates one or more control functions with the visual identifier;

a presentation module that selectively displays the visual identifier for the computer system component within a present view of a user interface, the present view displaying a graphical topology of an information technology system, wherein the presentation module selectively displays the visual identifier while the computer system component has a detail view outside the scope of the present view and to maintain the visual identifier in the present view as the present view changes to each of a plurality of views, the detail view of the computer system component being outside the scope of at least one of the plurality of views, each of the plurality of views displaying the graphical topology at a different detail level, the visual identifier applying a particular control function associated with the computer system component directly in each of the plurality of views in response to a selection received through the visual identifier, the presentation module further applying the particular control function to the computer system component in the present view while the computer system component is outside the scope of the present view in response to the selection received through the visual identifier; and a monitoring module that monitors the computer system component associated with the visual identifier and modifies the visual identifier in response to a change in operational status for the computer system component, wherein all or a portion of the identifier module, the function module, the presentation module, and the monitoring module comprise one or more of hardware and one or more non-transitory computer readable storage media storing executable code.

2. The apparatus of claim 1, wherein the particular control function comprises one of a naming function, a warning function, a tracking function, a storage activity, and a grouping function.

3. The apparatus of claim 1, wherein the visual identifier comprises one or more of a computer system component status and a computer system component context that the presentation module selectively displays in the present view.

4. The apparatus of claim 1, wherein the visual identifier comprises a related component list identifying one or more additional computer system components that have been associated with one or more additional visual identifiers by a particular initiator.

5. The apparatus of claim 1, wherein the presentation module couples the visual identifier to an icon representing a container of the computer system component associated with the icon.

6. The apparatus of claim 1, wherein the presentation module selectively displays a pop-up window containing one or more visual identifiers.

7. The apparatus of claim 1, wherein the presentation module simultaneously displays visual identifiers associated with a plurality of computer system components within a present view, at least one of said plurality of computer system components having a detail view outside the scope of the present view.

8. The apparatus of claim 1, further comprising a navigation module that changes the present view to a detail view of a computer system component in response to user selection of the visual identifier associated with the computer system component.

9. A system to monitor a computer system component in a storage area network, the system comprising:

one or more data storage servers in communication over a communication network;

a client in electronic communication with the one or more servers;

Input/Output (I/0) devices coupled to the data communications network and configured to interact with a user;

a processor;

a memory containing modules for execution on the processor, the modules comprising:

an identifier module configured to associate a plurality of visual identifiers with a plurality of computer system components wherein at least one visual identifier is associated with each computer system component, each identifier identifying an initiator of the association of the identifier with a corresponding computer system component;

a function module configured to associate one or more control functions with each computer system component associated with an visual identifier; and a presentation module configured to dynamically and selectively display at least one visual identifier for each computer system component associated with a visual identifier, to a present view of a user interface, the present view displaying a graphical topology of an information technology system, wherein the presentation module is configured to selectively display at least one visual identifier associated with a computer system component with a detail view outside the scope of the present view and to maintain the at least one visual identifier in the present view as the present view changes to each of a plurality of views, the detail view of the computer system component being outside the scope of at least one of the plurality of views, each of the plurality of views displaying the graphical topology at a different zoom level, the at least one visual identifier configured to apply a particular control function associated with the computer system component directly in each of the plurality of views in response to a selection received through the visual identifier; and the presentation module further configured to apply the particular control function to the computer system component in the present view while the computer system component is outside the scope of the present view in response to the selection received through the at least one visual identifier.

10. The system of claim 9, wherein the particular control function comprises one of a naming function, a warning function, a tracking function, a storage activity, and a grouping function.

11. A non-transitory computer usable medium having computer usable program code for monitoring computer system components, said non-transitory computer usable medium comprising:

computer usable program code for associating a visual identifier with a computer system component;

computer usable program code for associating one or more control functions with the visual identifier;

computer usable program code for selectively displaying the visual identifier for the computer system component to a present view of a user interface, the present view displaying a graphical topology of an information technology system, wherein the computer usable program code selectively displays the visual identifier while the computer system component has a detail view outside the scope of the present view, the visual identifier comprising a computer system component status;

computer usable program code for maintaining the visual identifier in the present view as the present view changes to each of a plurality of views, the detail view of the computer system component being outside the scope of at least one of the plurality of views, each of the plurality of views displaying the graphical topology at a different detail level, the visual identifier configured to apply a particular control function associated with the computer system component directly in each of the plurality of views in response to a selection received through the visual identifier;

computer usable program code for applying the particular control function to the computer system component in the present view while the computer system component is outside the scope of the present view in response to the selection received through the visual identifier; and computer usable program code for monitoring the computer system component associated with the visual identifier and modifying the visual identifier in response to a change in operational status for the computer system component.

12. The computer usable medium of claim 11, wherein the particular control function comprises one of a naming function, a warning function, a tracking function, a storage activity, and a grouping function.

13. The computer usable medium of claim 11, wherein the computer usable program code further comprises an operation to selectively display a visual identifier comprising a computer system component context in the present view.

14. The computer usable medium of claim 11, wherein the computer usable program code further comprises an operation to simultaneously display visual identifiers associated with a plurality of computer system components within a present view, at least two of said computer system components having a detail view outside the scope of the present view.

15. The computer usable medium of claim 11, wherein the computer usable program code further comprises an operation to change the present view to a detail view of a computer system component in response to user selection of the visual identifier associated with the computer system component.

16. The computer usable medium of claim 11, wherein the computer usable program code further comprises an operation to couple the visual identifier to an icon representing a container of the computer system component associated with the icon.

17. The computer usable medium of claim 11, wherein the computer usable program code further comprises an operation to selectively display a pop-up window containing one or more visual identifiers.

18. A method for monitoring a computer system comprising a plurality of computer system components, the method comprising:

identifying a computer system to monitor;

initiating a user interface;

executing an apparatus to monitor a computer system component through the user interface, the apparatus comprising a plurality of modules configured to:

associate a visual identifier with a computer system component, the visual identifier identifying an initiator of the association of the visual identifier with the computer system component;

associate one or more control functions with each computer system component associated with a visual identifier;

selectively display the visual identifier for the computer system component within a present view of a user interface, the present view displaying a graphical topology of the computer system;

selectively display the visual identifier while the computer system component has a detail view outside the scope of the present view;

maintaining the visual identifier in the present view as the present view changes to each of a plurality of views, the detail view of the computer system component being outside the scope of at least one of the plurality of views, each of the plurality of views displaying the graphical topology at a different zoom level, the visual identifier configured to apply a particular control function associated with the computer system component directly in each of the plurality of views in response to a selection received through the visual identifier; and applying the particular control function to the computer system component in the present view while the computer system component is outside the scope of the present view in response to the selection received through the visual identifier.

19. The method of claim 18, wherein the particular control function comprises one of a naming function, a warning function, a tracking function, a storage activity, and a grouping function.

20. The method of claim 18, wherein the visual identifier comprises a computer system component status that the modules selectively display in the present view.

* * * * *